United States Patent [19]

Tsao

[11] 4,360,405

[45] Nov. 23, 1982

[54] PROCESS FOR FRACTIONATING CLOSE BOILING COMPONENTS OF A MULTI-COMPONENT SYSTEM

[75] Inventor: Utah Tsao, Jersey City, N.J.

[73] Assignee: The Lummus Company, Bloomfield, N.J.

[21] Appl. No.: 281,536

[22] Filed: Jul. 8, 1981

Related U.S. Application Data

[62] Division of Ser. No. 148,977, May 12, 1980, Pat. No. 4,315,802.

[51] Int. Cl.³ .............................................. B01D 3/06
[52] U.S. Cl. ...................................... 203/24; 203/26; 203/88
[58] Field of Search ..................... 62/9, 11, 23, 24, 25, 62/26, 27, 28, 29, 30, 31, 32, 33, 34, 38, 39; 203/88, 24, 26, 10, 11; 202/235, 233, 234, 205

[56] References Cited

U.S. PATENT DOCUMENTS 2,530,602  11/1950  Dennis .................................... 62/27

*Primary Examiner*—Frank Sever
*Attorney, Agent, or Firm*—James N. Blauvelt

[57] ABSTRACT

There is disclosed a process and apparatus for the fractionation of close boiling components of a multi-component system and comprised of at least two fractionation columns having a plurality of equilibrium stages wherein the vapor from a down-stream fractionation column is compressed and passed into a lower portion of a preceding fractionation column. In a particularly preferred embodiment, the compressed overhead vapor stream is passed in heat transfer relationship to a liquid stream withdrawn from the preceding fractionation column prior to introduction into the lower portion of such preceding fractionation column.

5 Claims, 1 Drawing Figure

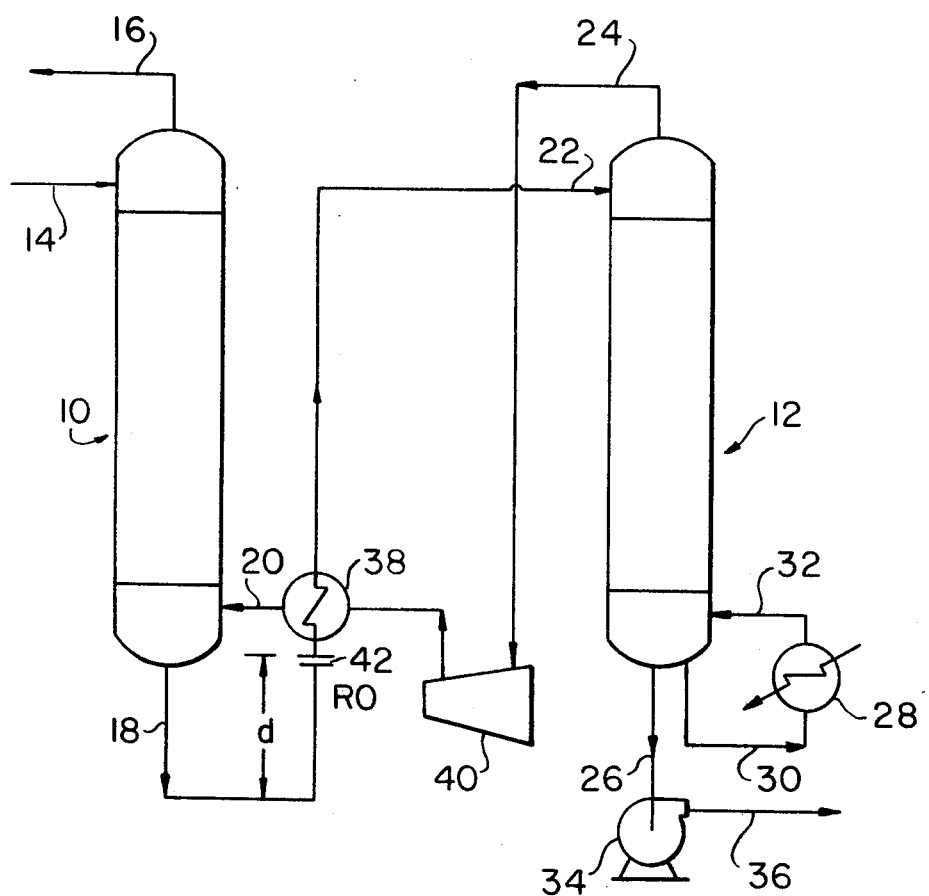

PROCESS FOR FRACTIONATING CLOSE BOILING COMPONENTS OF A MULTI-COMPONENT SYSTEM

This is a division, of application Ser. No. 148,977, filed May 12, 1980, now U.S. Pat. No. 4,315,802.

This invention relates to the fractionation from one another of close boiling components. In particular, this invention relates to the production of heavy water, and more particularly to an improved process and apparatus for the concentration by fractionation of heavy water containing liquid.

BACKGROUND OF THE INVENTION

In addition to the dual temperature enrichment systems for producing concentrated deuterium oxide, such as disclosed, inter alia, in U.S. Pat. No. 4,008,046 to Jerome S. Spevak, various fractionation systems have been disclosed, such as the rectifying column apparatus in U.S. Pat. No. 2,999,795 to Yaki et al. Generally, the fractionation of a 30% heavy water stream to a concentration of 99.7% deuterium oxide, requires an excess of 300 equilibrium stages when the fractionation is effected under a vacuum to improve the separation factor which varies between 1.052 (at 130° F.) and 1.030 (at 195° F.). Usually, two to four fractionation columns are employed operating with respective condensers and reboilers at preselect low pressures, and consequently do not function as separate sections of a single fractionation column in series to reduce the operating pressures of each section. Such an increase in operating pressure of such sections in series lowers the separation factor, such that an increase in reflux and number of equilibrium stages cancel any savings in equipment and utilities.

OBJECTS OF THE INVENTION

It is an object of the present invention to provide an improved process and apparatus for fractionating close boiling components of a multi-component solution.

Another object of the present invention to provide an improved process and apparatus for the concentration by fractionation of heavy water.

A further object of the present invention is to provide an improved process and apparatus for the concentration by fractionation of heavy water readily adaptible to existing heavy water fractionation plants.

Still another object of the present invention is to provide an improved process and apparatus for the concentration by fractionation of heavy water with substantial savings in steam and cooling water requirements.

Another object of the present invention is to provide an improved process and apparatus for the fractionation of close boiling components of a multi-component system.

SUMMARY OF THE INVENTION

These and other objects of the present invention are achieved in a process and apparatus for the fractionation of close boiling components of a multi-component system and comprised of at least two fractionation columns having a plurality of equilibrium stages wherein the vapor from a downstream fractionation column is compressed and passed into a lower portion of a preceding fractionation column. In a particularly preferred embodiment, the compressed overhead vapor stream is passed in heat transfer relationship to a liquid stream withdrawn from the preceding fractionation column prior to introduction into the lower portion of such preceding fractionation column.

DESCRIPTION OF THE DRAWING

Understanding of the present invention will be facilitated by referring to the following detailed description when taken with the accompanying drawing which is a schematic flow diagram thereof.

DETAILED DESCRIPTION OF THE INVENTION

To facilitate the description of the present invention, the process and apparatus thereof is hereinafter more fully described as applied to the fractionation of deuterium oxide-water system in the production of heavy water, however, the process and apparatus of the present invention is applicable to close boiling components of multi-component systems, systems such as xylene isomers, n-hexane/2-methyl pentane, n-pentane/2-methyl butane and the like. The term close boiling components of a multi-component system is understood to define a component system wherein the difference between the boiling points of the components are less than 10° F.

Referring now to the drawing, there are illustrated two fractionation columns, generally designated as 10 and 12, and formed with a plurality of equilibrium stages (not shown) and being the last two fractionation columns of a heavy water concentrating plant employing four fractionation columns for concentrating to about 99.7%, a 30% heavy water stream. Generally, such fractionation columns are operated at like temperatures and pressure in both the upper and lower portions thereof, i.e. a temperature and pressure in the upper portions of from 100° F. to 190° F. at 40 to 400 mm. Hg., and a temperature and pressure in the lower portion of from 180° F. to 220° F. at 400 to 850 mm. Hg. The latter column is operated at a lower pressure level. The fractionation column 10 is provided with a feed line 14, an overhead vapor line 16, a liquid effluent line 18 and lower vapor line 20. The fractionation column 12 is provided with feed line 22, an overhead vapor line 24, a liquid effluent line 26 and a reboiler 28 having an inlet line 30 and a vapor line 32 for introducing reboiled vapors into the lower portion of the fractionation column 12. The effluent line 26 is in fluid communication with the suction side of a pump 34 with the discharge side being in fluid flow communication with line 36.

The lower vapor line 20 of the fractionation column 10 is in fluid flow communication with the overhead vapor line 24 of the fractionation column 10 via a heat exchanger 38 and the discharge side of a compressor 40 of a compression ratio of from 1.5 to 10. The liquid effluent line 18 is provided with a restriction orifice 42 at a height "d" from the lower portion of line 18 and is in fluid communication via the heat exchanger 38 with the feed line 22 of the factionation column 12.

In operation, a partially concentrated heavy water stream, e.g. a stream containing 90% deuterium oxide is introduced by line 14 into the fractionation column 10 and is passed in counter-current contacting relationship with a vapor introduced by line 20 into the fractionation column 10. A liquid bottoms in line 18 is withdrawn and passed through the restriction orifice 42 wherein a pressure reduction of at least about 5 psi flash about 3% of the liquid sufficient to lift the resulting liquid-vapor mixture to the top portion of column 12. To ensure that the vapor portion of such liquid-vapor mixture is maintained, the flashed stream is passed through heat exchanger 38 in heat transfer relationship to the vapor stream in line 24 after compression in compressor 40, such vapor stream being superheated.

The orifice 42 is positioned at a height "d" of at least 5 feed from the lower porton of the outlet line 18 sized for self-venting. A level of liquid is automatically maintained in line 18. Thus, as the liquid level in line 18 drops below the elevation of the orifice 42, a portion of the liquid is caused to flash before reaching the orifice 42 and thereby restrict the flow through the orifice 42. Therefore, a liquid level will be automatically maintained in the outlet line 18 of the fractionation column 10 to meet the designed pressure drop requirement of the system. The elimination of a pump to passed liquid bottoms from the fractionation column 10 to fractionation column 12 lowers the elevation of the fractionation column 10 thereby eliminating the liquid surge requirements in the bottom of the fractionation column 10 with a concomitant inventory savings in heavy water.

The vapor-liquid stream containing 98% deuterium oxide in line 22 is passed in counter-current contacting relationship in fractionation column 12 to reboiled vapor in line 32 to form a concentrated heavy water product (99.7% $D_2O$) withdrawn via line 26 by pump 34 and passed by line 36 to storage facilities (not shown).

In accordance with the present invention, the compressor 40 overcomes a pressure build-up thereby to maintain low operating pressures for the fractionation columns 10 and 12 with a resulting savings in steam and cooling water substantially exceeding the cost of compressor power, i.e. the elimination of a condensor for the overhead in line 24 of fractionation column 12 which would be revaporized in a reboiler for fractionation column 10.

EXAMPLE

Operation of the process and apparatus is described in the following example which is intended to be merely illustrative and the invention is not to be regarded as limited thereto.

16,700 pound per hour of a heavy water stream of 90% deuterium oxide in line 14 is introduced into fractionating column 10 operated at a bottoms temperature and pressure of 190° F. and 425 mm. Hg., respectively. 15,200 pounds per hour of an overhead stream at a temperature and pressure of 126° F. and 100 mm. Hg. is withdrawn by line 24 from fractionating column 12 and is compressed in compressor 40 whereby the compressed overhead stream is heated to 425° F. prior to passage through heat exchanger 38 for introducton into the fractionating column 10 as the vapor stream in line 20. A bottoms stream in line 18 of 15,400 pounds per hour of a deuterium oxide content of 98% is passed through the restriction orifice 42 and thence through heat exchanger 38 prior to introduction into fractionating column 12 as the vapor-liquid mixture in line 22. A heavy water stream of a concentration of 99.7 percent deuterium oxide is withdrawn at the rate of 213 pounds per hour by line 36.

While the present invention has been described with reference to a preferred embodiment thereof, it will be understood that the restrictive orifice may be replaced by a liquid leveling device, however, the use of a liquid leveling device increased the residence time with a concomitant increase in liquid inventory. Additonally, the use of insulation about the transfer lines eliminate the requirement of the heat exchanger in the respective vapor-liquid lines. Additionally, if there are more than two fractionation columns operating at like pressures, a similar compressor and conduit assembly is preferably provided between the initial two fractionation columns.

While the invention has been described in connection with an exemplary embodiment thereof, it will be understood that many modifications will be apparent to those of ordinary skill in the art and that this application is intended to cover any adaptations or variations thereof.

What is claimed:

1. In a process for fractionating close-boiling components of a multi-component system wherein such multi-component system is sequentially passed through at least two fractionation columns operating in series at the same or like pressures and wherein a higher boiling component of said multi-component system is withdrawn as a liquid from a last fractionation column and wherein the lower boiling component is separated as a vapor from a fractionation column, the improvement comprising:
   (a) withdrawing a liquid bottom stream from one of said columns in series except the last of said columns and effecting expansion of said liquid bottom stream at a liquid head of a height sufficient to eliminate the requirement of a pump to pass the resulting liquid-vapor mixture to the next fractionation columns and to eliminate the liquid surge requirements in the bottom of said one column immediately preceding said next column;
   (b) compressing a vapor stream withdrawn from an upper portion of said next fractionation column; and
   (c) introducing the compressed vapor stream of step (b) into a lower portion of said fractionation column immediately preceding said next fractionation column.

2. The improved process for fractionating close boiling components of a multi-component system as defined in claim 1, wherein said compressed vapor stream of step (b) is cooled prior to introduction into said preceding fractionation column.

3. The improved process as defined in claim 1, wherein the liquid withdrawn from said one column is expanded, prior to passage to said next column, in indirect heat transfer relationship with said compressed vapor stream.

4. The process as defined in claims 1, 2 or 3 wherein said multi-component close-boiling system is a deuterium oxide-water solution.

5. The process as defined in claim 4, wherein said fractionation columns are operated at a top column temperature and pressure of 100° to 190° F. at 50 to 500 mm. Hg. and wherein said fractionation columns are operated at a bottom temperature and pressure of 180° to 220° F. at 400 to 850 mm. Hg.

* * * * *